Figure 1:
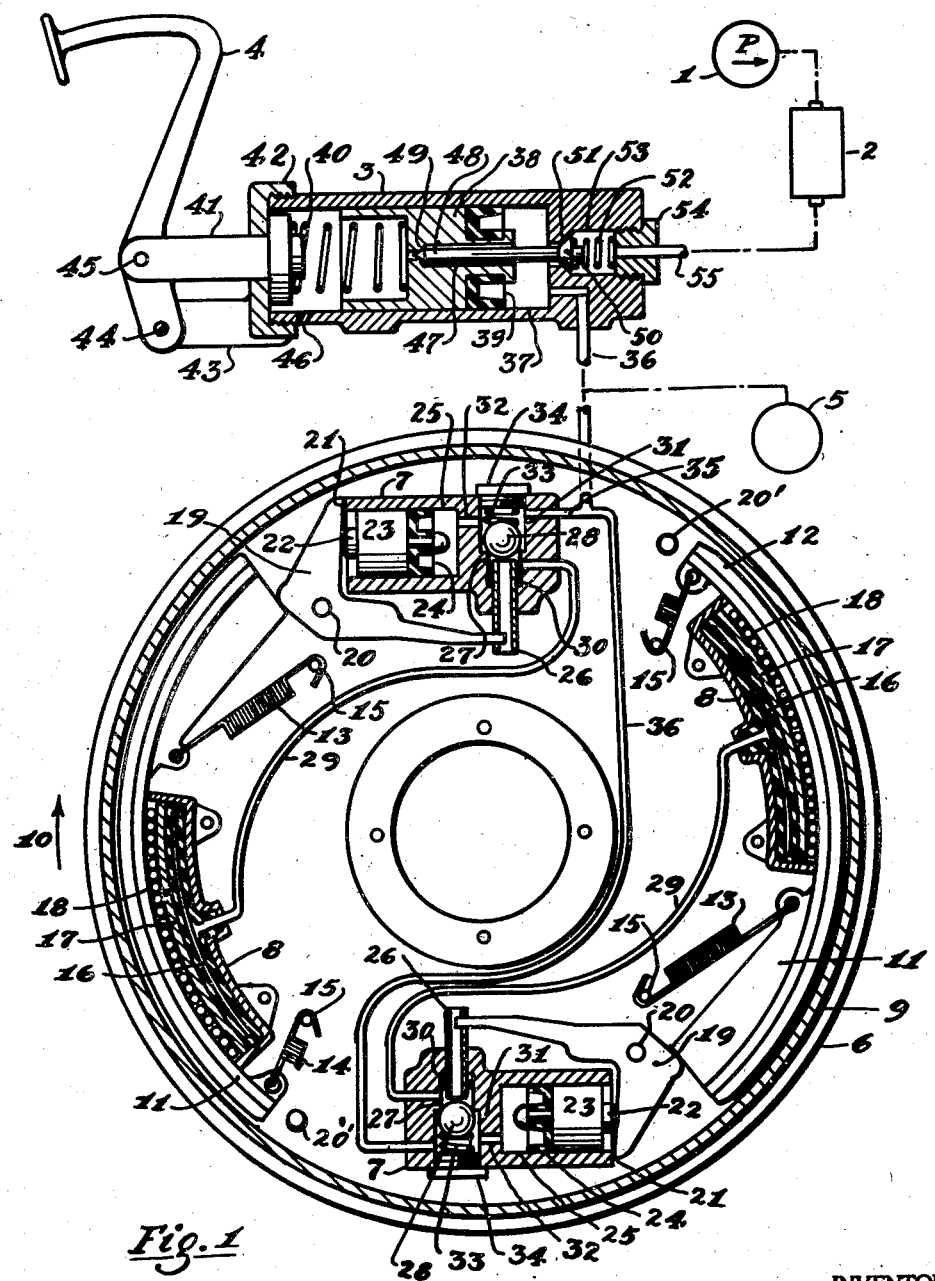

Jan. 21, 1947.  W. STELZER  2,414,675

POWER BRAKE

Filed Feb. 14, 1945

INVENTOR.
William Stelzer

Patented Jan. 21, 1947

2,414,675

UNITED STATES PATENT OFFICE 2,414,675
POWER BRAKE

William Stelzer, Summit, N. J.

Application February 14, 1945, Serial No. 577,895

8 Claims. (Cl. 188—152)

1

The invention relates to power brakes and more particularly to an improved air brake where the energizing force of the friction member is regulated to produce a brake torque that is in a pre-determined relation to the pedal pressure. The novel brake is related to that shown in my co-pending application Serial #509,382, filed November 8, 1943, now Patent No. 2,385,168, dated September 18, 1945.

The object of the invention is to produce a novel balanced brake using compressed air as a source of power and pressure sensitive means to control the force of actuation of the friction means in order to produce a brake torque that is in a pre-determined and constant proportion to the air pressure transmitted to the brake.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts, the single figure is a diagrammatic view of the novel brake system showing a wheel brake and the manually controlled valve in a sectional elevation.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed here is for the purpose of description and not limitation.

The novel braking system comprises an air pump 1 preferably driven by the power plant of the vehicle on which the system is employed, a storage tank 2 to accumulate a supply of air under pressure, a brake valve 3 actuated manually by means of a pedal or lever 4, and a plurality of brakes 5 of which one is shown in detail and consists of a fixed backing plate 6 to which control cylinders 7 and actuators 8 are secured. The brake is of the internal shoe, balanced type, where 9 indicates the brake drum revolving in a clockwise direction as shown by arrow 10. The brake shoes 11 having friction linings 12 are held in a released position against actuators 8 by means of retraction springs 13 and 14 to maintain the proper clearance between the lining and the internal surface of the drum. The springs

2 are anchored to pins 15 extending from the backing plate. The actuators 8 consist of rectangular curved cylinders whose sides conform to the curvature of shoes 11, housing bladders 16 and piston plates 17 to act against shoes 11 through the medium of anti-friction rollers 18 which also serve to reduce the transmission of heat from the friction lining to the rubber bladder.

The heel of each shoe engages a two arm lever 19 pivoted at 20 to a fixed anchor pin secured to the backing plate 6. Anchor pin 20' provides a stop for the shoe during reverse braking. In the released position, one arm of lever 19 rests against control cylinder 7 at 21 and also engages piston rod 22 of piston 23 having a seal 24 adapted to slide in cylinder bore 25. The other arm of lever 19 engages a hollow sleeve 26 slidable in housing 7 and entering bore 27 to engage valve ball 28 upon actuation of the lever. Bore 27 is in communication through line 29 with bladder 16 and is provided with a seal or packing 30 to prevent leakage of air through the bore in which the sleeve slides. Valve ball 28 is housed in a larger bore 31 in communication with bore 25 through passage 32. It is held against its seat at the bottom of bore 31 by a helical spring 33 retained by a plug 34 which also closes the bore 31. The latter is connected through lines 35 and 36 to chamber 37 of the manual brake valve, in which slides a piston 38 having a piston seal 39. The piston is in engagement with a spring 40 seated on plunger 41 slidable in end cap 42 from which a bracket 43 extends to provide the pivot 44 for brake pedal 4 which actuates plunger 41 through pin 45. The chamber in which spring 40 is housed is open to the atmosphere through hole 46. Piston 38 has a bore 47 to accommodate a needle valve 48 adapted to be seated at 49. The head 50 of valve 48 is seated on valve seat 51 by spring 52 to close off the passage between bores 37 and 53. The latter is provided with a plug 54 through which pressure line 55 extends to communicate with storage tank 2 and source of pressure 1.

In operation, depression of brake pedal 4 by the operator causes piston 38 to move to pick up valve 48 and to lift its head 50 from its seat to admit pressure from the supply of compressed air 2 into bore 37 and lines 36 and 35 which transmit it to bores 31 of the control cylinders in the brakes. Passages 32 further transmit the air pressure to chamber or bore 25 of each cylinder causing the piston to move against lever 19 which it engages. The latter is thereby actuated in a direction to force sleeve 26 against valve ball 28 to shut off bore 27 from the atmosphere. Further movement of the sleeve cracks ball 28 from its seat to allow the air pressure in bore 31 to be transmitted through conduit 29 to the bladder of actuator 8, whereby the brake shoe is forced against the drum through the medium of piston plate 17 and rollers 18. With the drum rotating in a clockwise direction as indicated by arrow 10, the shoe transmits the brake torque produced against lever 19 to oppose piston 23. The force of opposition is proportional to the lever ratio of lever 19, whereby it is desirable to construct the lever so as to have a shorter length from the pivot 20 to the point of contact of shoe 11 than to the point of contact of piston rod 22. Thus part of the brake torque is transmitted to anchor pin 20 and a fractional and proportional part to piston 23 so that the control cylinder may be kept small in size. Since valve 3, which is of conventional design, modulates the air pressure transmitted to act against piston 23 to be in proportion to the pedal pressure, the latter is in a fixed relation to the brake torque. If the torque should be too small to oppose the hydraulic pressure in chamber 25, the resulting yielding motion of lever 19 would immediately actuate sleeve 26 to admit more air through line 29 to the actuator. On the other hand, should the brake torque produced be too great, the lever would rotate in the opposite direction whereby ball 28 would become seated and conduit 29 would be opened to the atmosphere. It is thus apparent that the brake torque produced and the pedal pressure exerted by the operator are counterbalanced by each other and any movement resulting from loss of equilibrium between the two is immediately utilized to actuate the valve to produce a follow-up action causing the re-establishment of the equilibrium. In order to have ample control in case the coefficient of friction of the linings has decreased for some reason, the area of actuator 8 is of sufficient size so that the full air pressure available is never required to operate the actuator. Release of the brake pedal results in closing of poppet 50 of the modulating valve and opening of the needle valve 48 to relieve the pressure from chamber 37 through orifice 46 into the atmosphere. The drop in air pressure acting against piston 23 causes the latter to yield to the force of the brake torque so that valve 26 is opened to relieve the air pressure in the actuator, whereby the shoe is returned by springs 13 and 14 to the released position where it rests against the housing of the actuator. Thus the individual exhaustion of air in each brake causes a rapid releasing action. An added advantage is obtained as the exhaust air is forced through the brake and produces a cooling effect.

When the vehicle is moving in reverse and the drum revolves counterclockwise, the torque compensating feature is not used. Piston 23 urges lever 19 in a position where its valve applying arm rests against the housing of the control cylinder and the full air pressure is transmitted to actuator 8. The shoe exerts the brake torque against pin 20'. While the air pressure applied is greater than would be used in forward braking, the reduction of the wrapping effect of the shoe compensates for it.

Having thus described my invention, I claim:

1. In an air brake system having a source of air under modulated pressure representative of the desired brake application, in combination, an internal air brake comprising a revolving friction member, a floating brake shoe arranged near said revolving member, an actuator operable by air pressure arranged to urge said shoe directly and radially against said friction member into frictional contact therewith, control means responsive to the air pressure to communicate air pressure to said actuator, and opposing means at the heel of said shoe to serve as an anchor and being responsive to the brake torque of said shoe to interrupt the communication of air to said actuator and to open the latter to the atmosphere to reduce the brake application to produce a brake torque that is in a pre-determined proportion to said modulated air pressure.

2. The construction as claimed in claim 1, where a plurality of brakes are used.

3. The construction as claimed in claim 1, where said air brake comprises a plurality of brakes shoes.

4. The construction as claimed in claim 1, where said air brake comprises a plurality of individually controlled brake shoes and actuators.

5. The construction as claimed in claim 1, where said air brake comprises a pair of diametrically opposed brake shoes each having its individual control means and actuator to produce a balanced brake.

6. In an air brake system having a source of air under modulated pressure representative of the desired brake torque, in combination, an air brake comprising a revolving friction member, a floating brake shoe arranged near said revolving member, an actuator operable by air pressure arranged to urge said shoe directly against said friction member into frictional contact therewith, air pressure sensitive means arranged to oppose the brake torque of said shoe, air pressure transmitting means from said source of modulated air pressure to said pressure sensitive means, valve means to direct air pressure to said actuator, and means responsive to the yielding movement of said brake shoe to urge said valve means to direct air to said actuator and responsive to the yielding movement of said air pressure sensitive means to close the passage of air to said actuator and to open said actuator to the atmosphere said valve means being adapted to exhaust air from said actuator to within said brake.

7. In an air brake system having a source of air under modulated pressure representative of the desired brake application, in combination, an air brake comprising a revolving friction member, a floating brake shoe arranged near said revolving member, an actuator operable by air pressure arranged to urge said shoe directly against said friction member into frictional contact therewith, control means responsive to the air pressure to communicate air pressure to said actuator, opposing means responsive to the brake torque of said shoe to interrupt the communication of air to said actuator and to open the latter to the atmosphere to reduce the brake application to produce a brake torque that is in a pre-determined proportion to said modulated air pressure, and anti-friction means intermediate said actuator and said shoe to transmit the applying force in a direction perpendicular to the surface of said friction member in frictional contact with said shoe.

8. In an air brake system having a source of air under modulated pressure representative of the desired brake application, in combination, an air brake comprising a revolving friction member, a floating brake shoe arranged near said revolving member, an actuator operable by air pressure arranged to urge said shoe directly against said friction member into frictional contact therewith, control means responsive to the air pressure to communicate air pressure to said actuator, and opposing means responsive to the brake torque of said shoe to interrupt the communication of air to said actuator and to open the latter to the atmosphere to reduce the brake application to produce a brake torque that is in a pre-determined proportion to said modulated air pressure, said actuator comprising a stationary housing near the toe of said brake shoe, a bladder within said housing adapted to receive air pressure to actuate the toe portion of said shoe against said revolving friction member, a piston plate intermediate said shoe and said bladder, and antifriction rollers intermediate said plate and said brake shoe.

WILLIAM STELZER.